(12) United States Patent
Heipt et al.

(10) Patent No.: US 10,094,463 B2
(45) Date of Patent: Oct. 9, 2018

(54) LINEAR ACTUATOR

(71) Applicant: Schaeffler Technologies AG & Co. KG, Herzogenaurach (DE)

(72) Inventors: Peter Heipt, St. Ingbert (DE); Patrick Daniel, Kirkel (DE); Bettina Rudy, Sankt Ingbert (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/552,110

(22) PCT Filed: Mar. 4, 2016

(86) PCT No.: PCT/DE2016/200119
§ 371 (c)(1),
(2) Date: Aug. 18, 2017

(87) PCT Pub. No.: WO2016/141939
PCT Pub. Date: Sep. 15, 2016

(65) Prior Publication Data
US 2018/0038472 A1    Feb. 8, 2018

(30) Foreign Application Priority Data
Mar. 6, 2015   (DE) .................. 10 2015 204 073

(51) Int. Cl.
| | |
|---|---|
| *F16H 1/24* | (2006.01) |
| *F16H 55/02* | (2006.01) |
| *F16H 57/027* | (2012.01) |
| *F16H 25/20* | (2006.01) |
| *F16H 57/031* | (2012.01) |

(Continued)

(52) U.S. Cl.
CPC ........... *F16H 57/027* (2013.01); *F16H 25/20* (2013.01); *F16H 25/2015* (2013.01); *F16H 35/18* (2013.01); *F16H 57/031* (2013.01); *F16H 57/0497* (2013.01); *F16H 57/12* (2013.01);

(Continued)

(58) Field of Classification Search
CPC ......... F16H 2025/2031; F16H 25/2015; F16H 2025/2034
See application file for complete search history.

(56) References Cited

U.S. PATENT DOCUMENTS

| | | | | |
|---|---|---|---|---|
| 2004/0093969 A1* | 5/2004 | Nielsen | ............... | A47C 20/041 74/89.23 |
| 2011/0061481 A1 | 3/2011 | Zimmermann | | |
| 2011/0061841 A1 | 3/2011 | Zimmermann | | |

FOREIGN PATENT DOCUMENTS

| | | |
|---|---|---|
| DE | 10063743 C2 | 7/2002 |
| DE | 102008033602 A1 | 2/2009 |

(Continued)

*Primary Examiner* — Jake Cook
(74) *Attorney, Agent, or Firm* — Antun M. Peakovic (57) ABSTRACT

A linear actuator is disclosed having a housing and a plurality of components arranged in the housing. The actuator may include
- at least one conducting component,
- a group of mechanical, non-conducting components including components of a spindle mechanism, and
- at least one bearing arrangement designed to support components of the spindle mechanism in the housing.

The at least one conducting component may be separated from the group of mechanical, non-conducting components by at least one seal in such a way that two mutually separate spaces sealed off from one another are formed within the housing.

20 Claims, 4 Drawing Sheets

(51) Int. Cl.
*F16H 57/04* (2010.01)
*F16H 57/12* (2006.01)
*F16H 35/18* (2006.01)

(52) U.S. Cl.
CPC ................ *F16H 2025/2031* (2013.01); *F16H 2025/2034* (2013.01); *F16H 2025/2075* (2013.01)

(56) References Cited

FOREIGN PATENT DOCUMENTS

| | | |
|---|---|---|
| DE | 102008025072 A1 | 12/2009 |
| DE | 2020100004265 U1 | 8/2010 |
| DE | 102011078646 A1 | 1/2013 |
| EP | 1729401 A2 | 12/2006 |
| EP | 2679865 A1 | 1/2014 |

* cited by examiner

LINEAR ACTUATOR

CROSS-REFERENCE TO RELATED APPLICATIONS

This application is the U.S. National Phase of PCT Appln. No. PCT/DE2016/200119 filed Mar. 4, 2016, which claims priority to DE 102015204073.9 filed Mar. 6, 2015, the entire disclosures of which are incorporated by reference herein.

TECHNICAL FIELD

The disclosure relates to a linear actuator, for example, a linear actuator having an electric drive.

BACKGROUND

A spindle drive having an integrated drive motor is known from DE 20 2010 004 265 U1, for example. A spindle drive of this kind can be used to adjust photovoltaic modules or parabolic antennae, for example. The spindle drive has a casing tube, which surrounds a spindle. A tubular connecting rod and a protective sleeve are connected to a spindle of the known spindle drive, wherein the protective sleeve can be moved axially on the casing tube. This is intended to provide good protection, even under extreme climatic conditions.

Another linear actuator with a motor drive is known from US 2011/0061481 A1, for example. Within this actuator there is an axial bearing, which is designed as a rolling bearing.

SUMMARY

One object of the disclosure is to enhance a linear actuator in comparison with the known prior art, especially in respect of a favorable relationship between outlay on manufacture and durability, even under unfavorable environmental conditions.

According to the disclosure, this object may be achieved by an actuator having the features described herein and in FIGS. 1-6. The linear actuator according to the disclosure may be provided with a housing and with a plurality of components arranged in the housing, namely at least one conducting component and a group of mechanical, non-conducting components, which may comprise components of a spindle mechanism, as well as at least one bearing arrangement designed to support components of the spindle mechanism in the housing. The at least one conducting component may be separated from the group of mechanical, non-conducting components by at least one seal in such a way that two mutually separate spaces sealed off from one another are formed within the housing. The continuous housing wall of the integrally formed column-shaped housing may surround the two spaces, wherein the space containing the conducting components is subdivided into two subspaces. An electric motor may be arranged in one subspace and a sensor-system component may be arranged in the other subspace.

The continuous housing wall of the integrally formed column-shaped housing may ensure weather-tight protection for the components arranged in the housing. This actuator according to the disclosure may reduce the number of parts since the column-shaped housing may be of integral construction, apart from any end closures which are provided. The housing can be designed as a tube, for example.

The subdivision according to the disclosure of the space accommodating the conducting components into two subspaces allows a mode of construction according to which both the electric motor and the sensor-system components can be inserted from one or both ends of the housing. The two subspaces can both extend along the longitudinal axis of the column-shaped housing and can be arranged adjacent to one another, when viewed in a cross section through the column-shaped housing. This arrangement allows a mode of construction according to which both subspaces can be opened toward a common end when an end closure is removed. This enables the electric motor and the sensor-system component to be inserted into the housing and into the mutually separate subspaces from the common end, for example. Another embodiment of the disclosure can envisage a mode of construction according to which the electric motor can be inserted into the column-shaped housing from one end and the sensor-component can be inserted into the column-shaped housing from the opposite end.

The dividing wall between the two subspaces can be formed integrally with the column-shaped housing; however, it may be expedient to produce this dividing wall separately and insert it into the column-shaped housing and optionally secure it thereon.

The housing can be subdivided into a plurality of mutually separate spaces by at least one static and one dynamic seal. The spaces may be an "electrical-system chamber" and a "mechanical-system chamber".

Conducting components of the linear actuator, which can include an electric drive as well as components of the data processing system and line, can be arranged exclusively in the first space, i.e. the electrical-system chamber of the actuator. At least one Hall-effect sensor can be arranged in the electrical-system chamber, for example, as a sensor for recording angular positions and/or rotary movements.

A spindle mechanism, together with the associated bearing arrangement, can be arranged in the second space, i.e. the mechanical-system chamber. The spindle mechanism can be designed as a ball screw, as a simple motion-transmitting thread or as a rolling-contact planetary transmission, for example. A rolling bearing, in particular an axial ball bearing, axial roller bearing or axial needle bearing providing support in both axial directions, may be provided to support the spindle of the spindle mechanism, this bearing being arranged within the mechanical-system chamber.

The electric motor which drives the spindle can either have its own bearing arrangement or be designed as a direct drive with a rotor without its own bearing arrangement. In the latter case, the rotor of the electric motor is connected rigidly to the spindle of the spindle mechanism while, in the first case, a compensating coupling is optionally inserted between the electric motor and the spindle. In both cases, the rotor of the electric motor is arranged within the electrical-system chamber separated from the mechanical-system chamber in a sealed manner. In contrast to the bearing arrangement described, which is designed as an axial rolling bearing, a sliding bearing arrangement is preferably provided to support a tubular connecting rod that can be moved by means of the associated spindle nut and extended out of the housing. Here, a sliding bearing element inserted into the housing can directly adjoin a cover which closes off the housing at the end and is dynamically sealed with respect to the tubular connecting rod.

A continuous housing wall, which may be formed by a metal profile, may surround both the electrical-system chamber and the mechanical-system chamber of the actuator. Apart from covers at the ends, the housing of the actuator may be of integral construction. Overall, the housing may have a column shape. The end covers can be manufactured from metal, e.g. from steel sheet or from a metallic material subject to primary forming and/or machining, or from plastic.

The housing of the actuator is supported in a connection structure which allows it to be tilted, for example. For this purpose, there can be bearing journals on the housing which form components of a sliding bearing arrangement. Depending on the dimensioning and application, it is likewise possible to install the housing of the actuator rigidly in a connection structure. In both cases, a connecting thread, e.g. for a joint eye for pivotable connection to another design element, can be situated at the end of the connecting rod of the spindle mechanism.

The actuator drive motor situated in the electrical-system chamber can be combined with a transmission to form a geared motor. The transmission is a planetary transmission, for example, allowing coaxial arrangement of the drive motor and the spindle mechanism and hence, overall, a slim design of the actuator. Both in the case of embodiments with direct electrical drive of the spindle and in the case of embodiments with an interposed transmission, a shaft duct between the electrical-system chamber and the mechanical-system chamber is the only point at which the electrical-system chamber has to be sealed not only statically but also dynamically.

In one embodiment, all the components of the actuator which are situated in the electrical-system chamber are of maintenance-free design. Accordingly, there is a lubricating connection or a plurality of lubricating connections at most in the second space of the actuator. By virtue of the fact that at least one component of the spindle mechanism, in particular a tubular connecting rod, can be extended out of the mechanical-system chamber of the actuator, the air-filled volume within the mechanical-system chamber is variable. An air admission and release device for the mechanical-system chamber can comprise a diaphragm or a double diaphragm valve, for example. The air admission and release device can be integrated into a cover, such as a plastic cover, which closes off the housing at the end, wherein it is spaced apart radially from the component which can be extended out of the mechanical-system chamber, i.e. the connecting rod, of the actuator and is thus arranged asymmetrically with respect to the spindle mechanism.

In another embodiment, there is no comparable air release device on the electrical-system chamber of the actuator. The dynamic seal between the electrical-system chamber and the mechanical-system chamber allows slight pressure differences between the two chambers of, for example, up to a few millibars. To counteract excessive heating of the electrical-system chamber, the housing of the actuator can be designed as an extruded profile, composed of a light metal alloy, for example, the profile ribs of which also act as cooling ribs. Moreover, the ribs of the extruded profile can also be used to attach mechanical components to the actuator. There can be various mechanical connection contours within the electrical-system chamber, e.g. a centering receptacle for a limit switch and a receptacle for a circuit board. Counter-sunk screws conforming to DIN 605, for example, are suitable for fixing by means of such receptacles and connection contours, in particular with T slots.

The advantages of dividing the electrical-system chamber in two, namely a main electrical-system space, in which the electric motor is situated, and a secondary electrical-system space, in which there is at least one sensor-system component, in particular a position sensor, have been described above. The main electrical-system space can be arranged as a first subspace as a linear extension of the spindle mechanism, while the second subspace, namely the secondary electrical-system space, extends over the majority of the length of the housing, e.g. over more than 80% or more than 90% of the length of the housing, wherein this second subspace can be arranged parallel to the center line of the spindle mechanism.

The cross-sectional contours of both subspaces of the electrical-system chamber may be formed directly from the extruded profile which represents the main component of the housing. When viewing the housing in cross section in a direction along the spindle axis, there may be no overlaps between the two subspaces of the electrical-system space. In this arrangement, a housing partition wall extending parallel to the center line of the spindle mechanism delimits the second subspace both with respect to the first subspace and with respect to the mechanical-system chamber.

The length of the secondary electrical-system space, measured in the axial direction of the spindle mechanism and hence of the overall actuator, may correspond to the total length of the housing. This has the advantage that the secondary electrical-system space offers sufficient space both to accommodate electronic components that control the electric motor and position sensors that detect the setting of the spindle mechanism, e.g. limit switches, wherein the mechanical-system space remains free from any electric components. The secondary electrical-system space can also contain the complete sensor system for a linear, incremental or absolute measuring system designed to detect the position and/or movement of the connecting rod of the actuator. As an option, the sensor system is part of a path control system of the actuator.

The advantage of the disclosure may lie in that a seamless wall, formed by a metal profile, of the housing of the actuator delimits various spaces and subspaces which, in one case, accommodate exclusively mechanical components and, in another case, electric components and electronic components. In the latter case, there is an electric component, namely an electric motor, in a first subspace, while associated electronic components, including sensors, are situated in a second subspace. Here, the sensors interact with structures of non-conducting parts in a space separated from the two subspaces, in particular separated fluid-tightly by a plurality of seals.

The actuator may be suitable for use outdoors, e.g. as a component for adjusting a solar module. By virtue of the subdivision of the housing interior into spaces which allow the entry and exit of media to different extents and in a manner matched to the respectively installed components, the actuator can be operated with little wear, even under unfavorable weather conditions, such as precipitation of all kinds or sandstorms. Similar statements apply when the actuator is used close to the sea. The linear actuator is also suitable for mobile uses.

BRIEF DESCRIPTION OF THE DRAWINGS

An illustrative embodiment of the disclosure is explained in greater detail below by means of a drawing, in which.

DETAILED DESCRIPTION

The figures show an electrically operated linear actuator, denoted overall by the reference sign 1, in respect of the basic functioning of which attention is drawn to the prior art cited at the outset.

The actuator 1 has a housing 2 having a continuous housing wall 3, which is formed by a metal profile and extends approximately over the entire length of the actuator 1. Situated within the housing 2 are two mutually separated spaces 4, 5, namely an electrical-system chamber 4, also referred to as the first space, and a mechanical-system chamber 5, also referred to as the second space. Conducting components, including an electric motor 6, are accommodated in the electrical-system chamber 4. A spindle mechanism 7 driven by the electric motor 6 is situated in the mechanical-system chamber 5.

A bearing unit 8, which is sealed off with respect to the housing wall 3 by a static seal 9, is arranged in the housing 2 at the interface between the electrical-system chamber 4 and the mechanical-system chamber 5. The bearing unit 8 is penetrated by a connecting shaft 10, which connects the electric motor 6 to the spindle mechanism 7 and is sealed off with respect to the bearing unit 8 by a dynamic seal 11. The connecting shaft 10 is supported in the bearing unit 8 by means of a rolling bearing, such as a double-row axial ball bearing 12. The dynamic seal 11 is directly adjacent to the double-row axial ball bearing 12, wherein it is arranged on the side of the double-row axial ball bearing 12 facing the electrical-system chamber 4, and therefore the double-row axial ball bearing 12 is situated within the mechanical-system chamber 5. For re-lubrication of the double-row axial ball bearing 12, a lubricant feed 13 in the form of a lubricating nipple is provided. When viewed in the axial direction of the spindle mechanism 7, the lubricant feed 13 is situated between the two rolling element rows of the axial ball bearing 12.

In contrast, there may be no re-lubrication of components within the electrical-system chamber 4. This applies even in cases in which the electric motor 6 drives the connecting shaft 10 and hence the spindle mechanism 7 via a transmission, e.g. a planetary transmission. The spindle mechanism 7 comprises a spindle 14, which is firmly connected to the connecting shaft 10, and a spindle nut 15. A jacket tube 16, also referred to as a tubular connecting rod, which represents a component of the spindle mechanism 7 which can be extended out of the housing 2, is connected to the spindle nut 15.

The electrical-system space 4 is subdivided into two subspaces 17, 18, namely a main electrical-system space 17 and a secondary electrical-system space 18. The main electrical-system space 17, which is also referred to as an upper electrical-system space without restricting generality, has the same cross section as the mechanical-system space 5 and—when viewed in the axial direction of the spindle mechanism 7—is mounted ahead of the mechanical-system space 5. In contrast, the secondary electrical-system space 18, which is also referred to as the lower electrical-system space, is more extensive in the axial direction than the main electrical-system space 7, and therefore there is an overlap between the mechanical-system space 5 and the secondary electrical-system space 18. In other words: there is at least one plane normal to the longitudinal axis of the spindle mechanism 7 which intersects both the mechanical-system space 5 and the secondary electrical-system space 18. In particular, such a plane intersects a limit switch 19, referred to in general terms as a sensor-system component, which is arranged in the secondary electrical-system space 18, is designed as a contactless inductive sensor and interacts with the spindle nut 15 or a part connected firmly to the spindle nut 15.

In the illustrative embodiment shown, the secondary electrical-system space 18 extends over the entire length of the housing 2. In particular, this allows installation of a plurality of sensors constructed in a manner corresponding to the limit switch 19, which detect the position of the spindle nut 15. Associated electric lines are likewise laid in the secondary electrical-system space 18. At the end of the actuator 1 at which the electric motor 6 is situated, the main electrical-system space 17 is connected to the secondary electrical-system space 18 by a cable penetration 21. In the illustrative embodiment, the cable penetration 21 is situated in a partition wall 22 which separates the secondary electrical-system space 18 both from the mechanical-system space 5 and from the main electrical-system space 17. Like the housing wall 3, the partition wall 22 is formed directly from the metal profile from which the housing 2 is produced.

Figure 1:
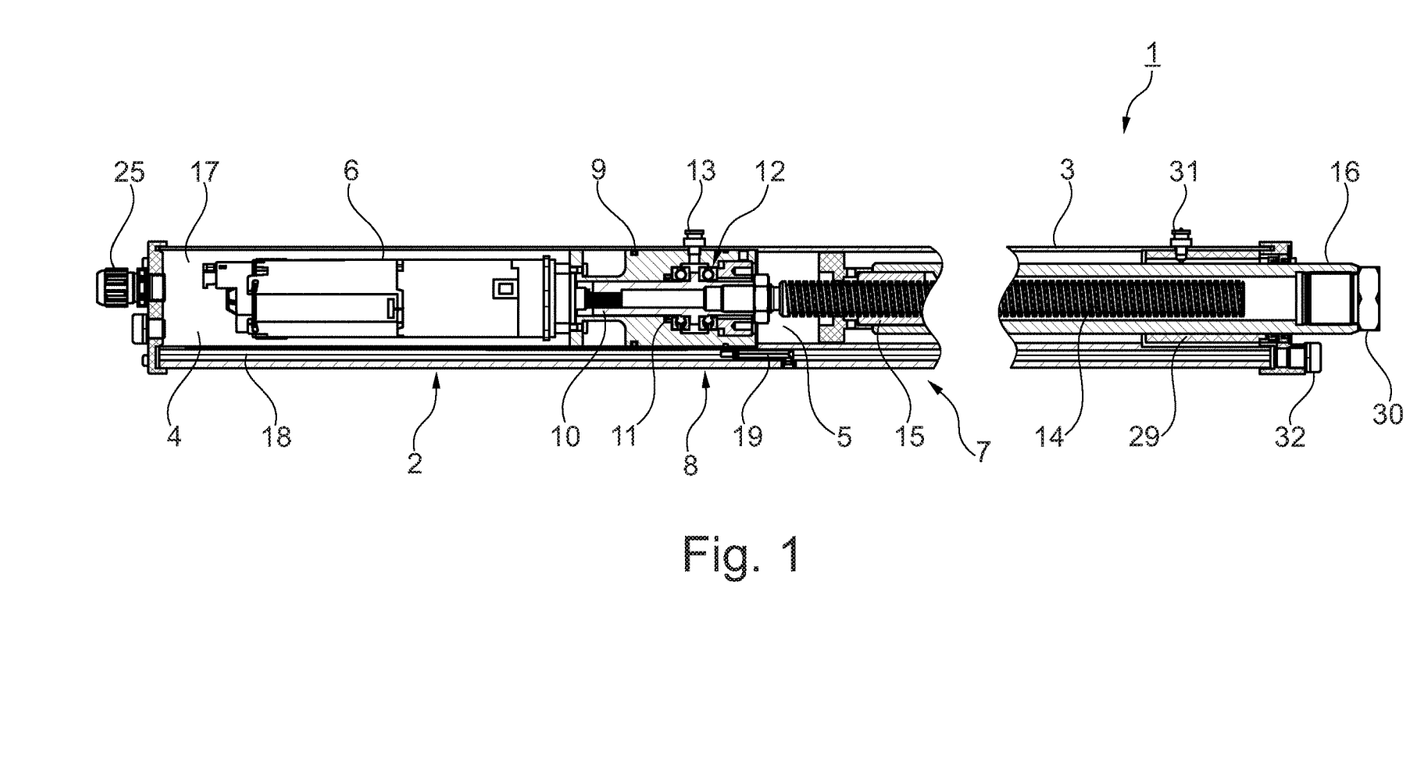
FIG. 1 shows a linear actuator in section.
Figure 2:
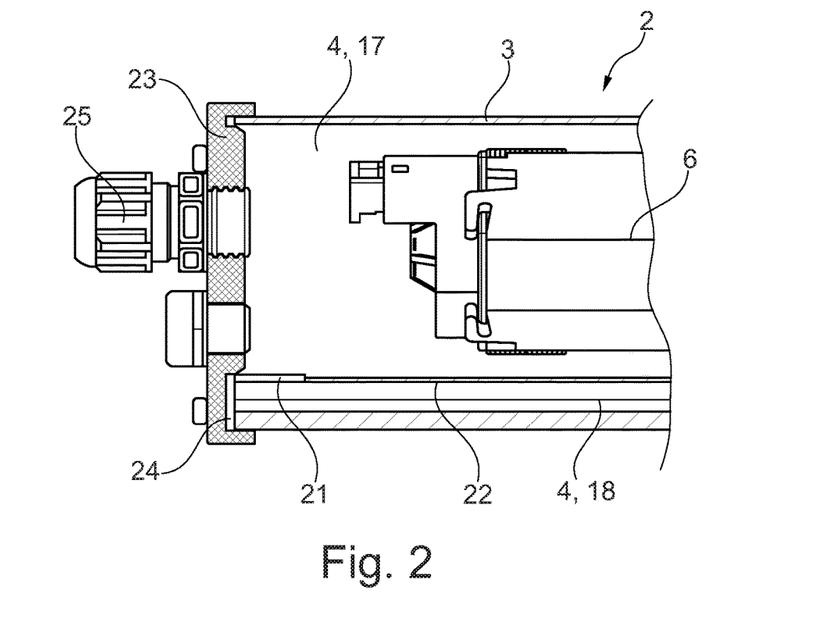
FIGS. 2, 3, and 4 show details of the actuator in views according to FIG. 1.
Figure 3:
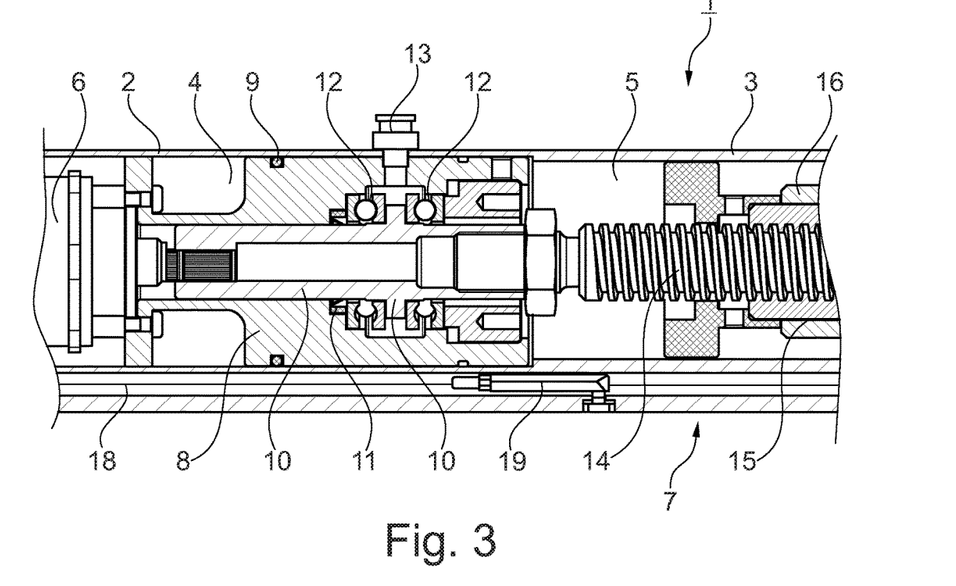

As a departure therefrom, the cable penetration 21 could also be situated in a cover 23 which covers the electrical-system space 4 at the motor end (visible in FIG. 2) of the actuator 1. The cover 23, which may be manufactured from plastic, is sealed off with respect to the metallic housing wall 3 by a seal 24. In addition, by overlapping the housing wall 3, the cover 23 forms a gap seal, which protects seal 24, in particular provides protection for seal 24 from coarse dirt and aging due to UV radiation. A screwed cable gland denoted by 25 is furthermore visible on the cover 23.

Figure 4:
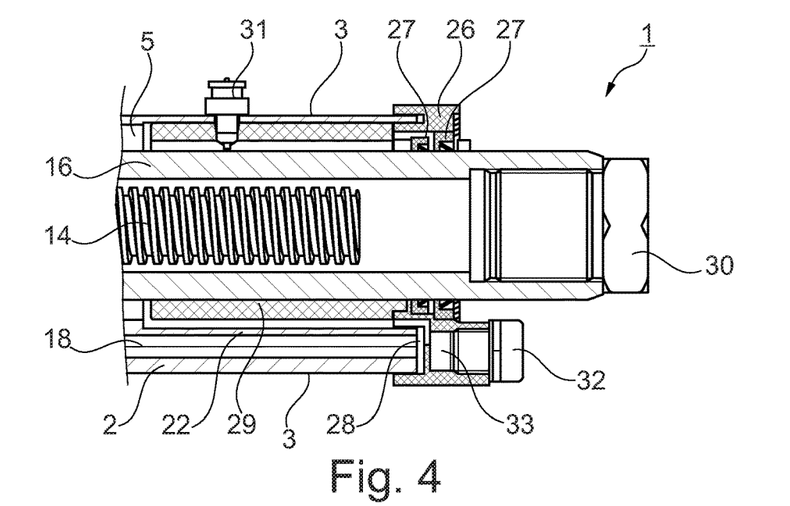

The end of the actuator 1 at which the jacket tube 16, also referred to as the tubular connecting rod, projects from the housing 2 is shown in FIG. 4. At this end, the housing 2 is closed by a cover, in this case denoted by 26, wherein the jacket tube 16 is sealed off with respect to cover 26 by two seals 27 arranged in series. Cover 26 closes off both the mechanical-system chamber 5 and the secondary electrical-system space 18. A static flat gasket 28 is inserted between the secondary electrical-system space 18 and cover 26. In a manner similar to the design of cover 23 on the side of the main electrical-system space 7, cover 26 is shaped in such a way that it protects the flat gasket 28 from coarse dirt and UV radiation.

To guide the jacket tube 16, a sliding bearing element 29, which interacts directly with the jacket tube 16, is provided at the end of the housing 2 which is closed with the aid of cover 26 and the dynamic seals 27 and static flat gasket 28. At its end projecting from the housing 2, the jacket tube 16 is closed by a connection element 30, to which a joint eye can be connected, for example.

For re-lubrication of the spindle mechanism 7, a lubricant feed 31 is provided in the region of the sliding bearing element 29, said feed being designed in a manner corresponding to the lubricant feed 13 on the rolling bearing 12 and penetrating the housing 2 and the sliding bearing element 29. As can be seen especially from FIG. 4, the sliding bearing element 29 directly adjoins cover 26.

To admit and release air to and from the mechanical-system chamber 5, an air admission and release device, referred to as ventilation element 32 for short, is integrated into cover 26. The ventilation element 32 is arranged as a linear extension of the secondary electrical-system space 18 and is connected to the mechanical-system chamber 5 via a ventilation duct 33 formed in cover 26. In contrast, the secondary electrical-system space 18 is completely closed on the side of cover 26, unlike on the side of the motor-side cover 23 provided with the screwed cable gland 25, wherein the closure is produced by cover 26.

Figure 5:
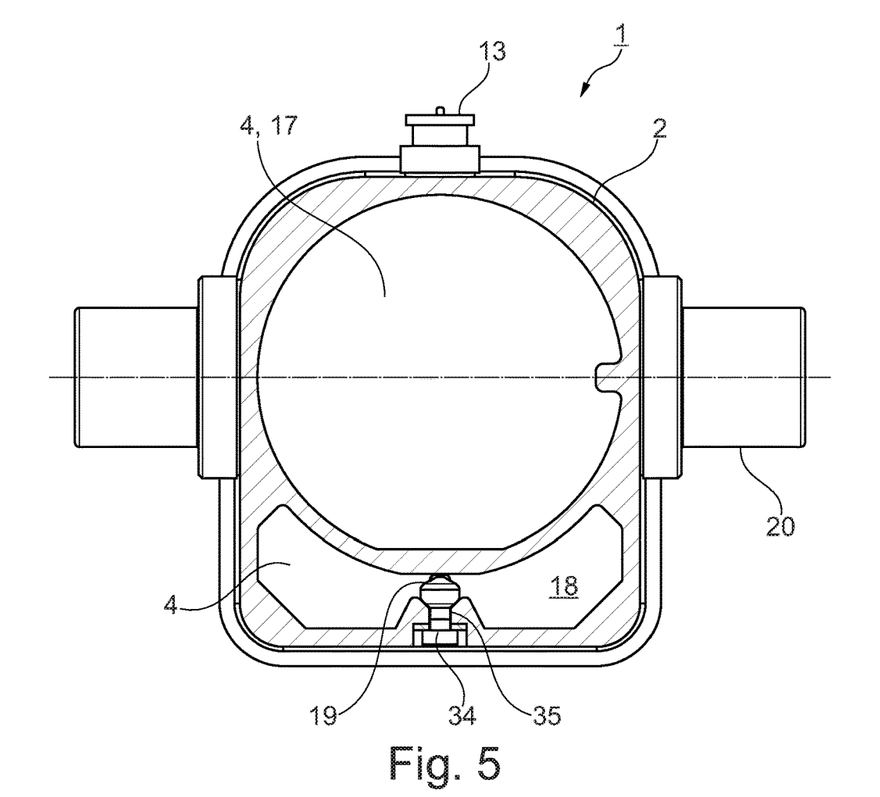
FIGS. 5 and 6 each show a cross section through the linear actuator.
Figure 6:
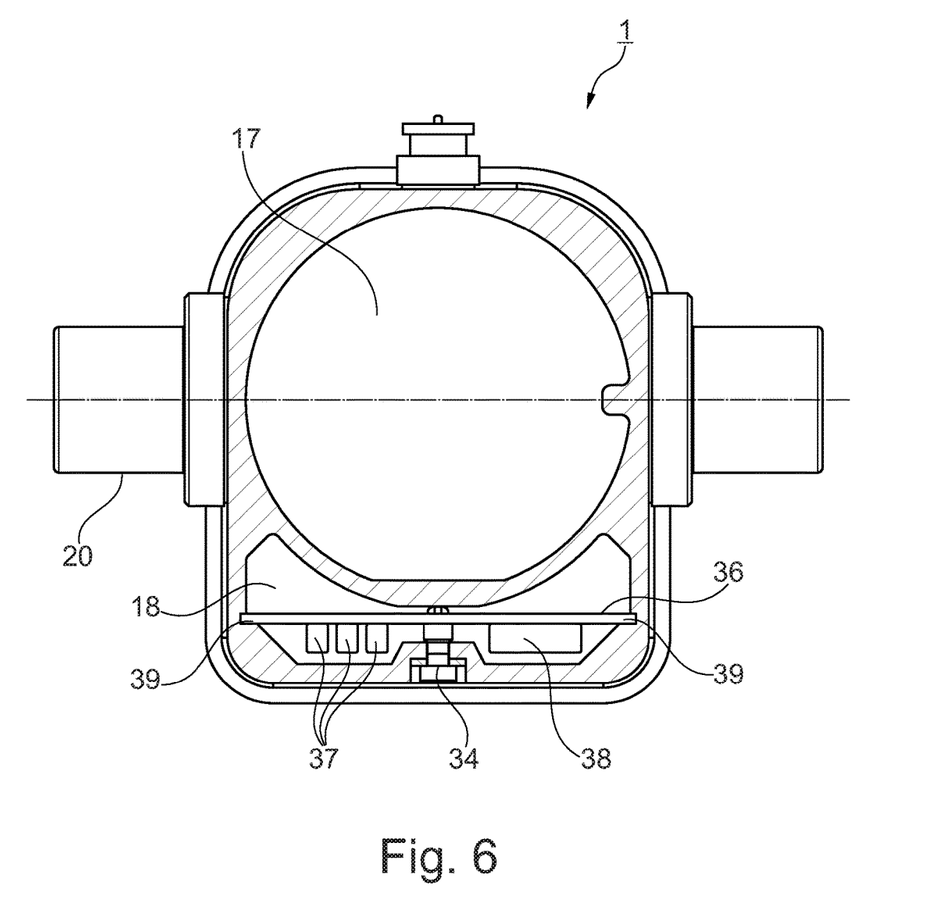

FIGS. 5 and 6 show two sections through the actuator 1, in each of which the mechanical-system chamber 5 and the secondary electrical-system space 18, situated thereunder, can be seen. Bearing journals, by means of which the actuator 1 as a whole can be supported, are denoted by 20.

As can be seen from FIG. 5, the limit switch 19 arranged in the secondary electrical-system space 18 is centered by means of a fastening screw 34 accessible from the outside. The corresponding centering receptacle for the limit switch 19 in the housing 2 is denoted by reference sign 35.

As can be seen from FIG. 6, a further fastening screw 34 is provided within the secondary electrical-system space 18 to fix a circuit board 36 on which various component elements 37, 38 are situated. At the sides, the circuit board 35 engages in guide grooves 39, referred to in general terms as a receptacle, which are formed in the housing wall 3. The housing 2 thus simultaneously performs numerous functions, including the support of the spindle mechanism 7, of the electric motor 6 and of the other, conducting components 19, 37, 38.

LIST OF REFERENCE SIGNS 1 actuator
2 housing
3 housing wall
4 first space, electrical-system chamber
5 second space, mechanical-system chamber
6 electric motor
7 spindle mechanism
8 bearing unit
9 static seal
10 connecting shaft
11 dynamic seal
12 rolling bearing, double-row axial ball bearing
13 lubricant feed
14 spindle
15 spindle nut
16 jacket tube
17 subspace, main electrical-system space
18 subspace, secondary electrical-system space
19 limit switch
20 bearing journal
21 cable penetration
22 partition wall
23 cover
24 seal
25 screwed cable gland
26 cover
27 seal
28 static flat gasket
29 sliding bearing element
30 connection element
31 lubricant feed
32 ventilation element
33 ventilation duct
34 fastening screw
35 centering receptacle
36 circuit board
37 component element
38 component element
39 guide groove, receptacle

The invention claimed is:

1. A linear actuator, having a housing and having a plurality of components arranged in the housing, the linear actuator comprising:
at least one conducting component;
a group of mechanical, non-conducting components, which comprise components of a spindle mechanism;
at least one bearing arrangement designed to support components of the spindle mechanism in the housing;
the at least one conducting component being separated from the group of mechanical, non-conducting components by at least one seal in such a way that two mutually separate spaces sealed off from one another are formed within the housing; and
a continuous housing wall of the housing surrounds the two spaces, wherein a first of the spaces contains the conducting components and is subdivided into two subspaces, and wherein an electric motor is arranged in a first subspace and a sensor-system component is arranged in a second subspace.

2. The actuator as claimed in claim 1, wherein the continuous housing wall is formed by a metal profile and bounding both spaces.

3. The actuator as claimed in claim 1, wherein a ventilation element is arranged in a second of the spaces in which the group of mechanical, non-conducting components, including a component which can be extended out of the space, is situated.

4. The actuator as claimed in claim 3, wherein the ventilation element is selected from the group of ventilation elements which comprises a diaphragm and a double diaphragm valve.

5. The actuator as claimed in claim 3, wherein the ventilation element is integrated into a cover which closes off the housing at an end, wherein it is spaced apart radially from the component which can be extended out of the space.

6. The actuator as claimed in claim 1, wherein only a second of the spaces in which the group of mechanical, non-conducting components is situated has at least one lubricant feed.

7. The actuator as claimed in claim 1, wherein the two subspaces are arranged adjacent to one another, when viewed in a cross section through the housing, and are accessible from one end.

8. The actuator as claimed in claim 1, wherein the two subspaces have different cross sections, when viewed in a cross section through the housing, and are of different lengths, measured in an axial direction of the spindle mechanism.

9. The actuator as claimed in claim 7, wherein the first subspace, in which the electric motor is situated, is arranged as a linear extension of the spindle mechanism, and the second subspace, in which at least one sensor-system component interacting with the spindle mechanism is situated, is arranged parallel to a center line of the spindle mechanism (7), extending over a majority of a length of the housing, wherein a partition wall of the housing delimits the second subspace both with respect to the first subspace and with respect to a second of the spaces in which the group of mechanical, non-conducting components is situated.

10. The actuator as claimed in claim 7, wherein a centering receptacle for a limit switch is arranged in an axially longer sub-space of the first space in which the conducting component is situated.

11. The actuator as claimed in claim 7, wherein a receptacle for a circuit board is arranged in an axially longer subspace of the first space in which the conducting component is situated.

12. A linear actuator, comprising:
a column-shaped housing including a housing wall;
a conducting component;
a group of mechanical, non-conducting components including components of a spindle mechanism;
at least one bearing arrangement designed to support components of the spindle mechanism in the housing;

the conducting component being separated from the group of mechanical, non-conducting components by at least one seal in such a way that two mutually separate spaces sealed off from one another are formed within the housing, a first space and a second space; and the housing wall surrounding the two spaces, wherein the first space contains the conducting component and is subdivided into two subspaces, and wherein an electric motor is arranged in a first subspace and a sensor-system component is arranged in a second subspace.

13. The actuator as claimed in claim 12, wherein the housing wall is formed by a metal profile and bounding both spaces.

14. The actuator as claimed in claim 12, wherein a ventilation element is arranged in the second space in which the group of mechanical, non-conducting components, including a component which can be extended out of the space, is situated.

15. The actuator as claimed in claim 14, wherein the ventilation element includes a diaphragm or a double diaphragm valve.

16. The actuator as claimed in claim 14, wherein the ventilation element is integrated into a cover which closes off the housing at an end, wherein it is spaced apart radially from the component which can be extended out of the space.

17. The actuator as claimed in claim 12, wherein the two subspaces are arranged adjacent to one another, when viewed in a cross section through the housing, and are accessible from one end.

18. The actuator as claimed in claim 17, wherein a centering receptacle for a limit switch is arranged in an axially longer sub-space of the first space in which the conducting component is situated.

19. The actuator as claimed in claim 17, wherein a receptacle for a circuit board is arranged in an axially longer subspace of the first space in which the conducting component is situated.

20. The actuator as claimed in claim 12, wherein the two subspaces have different cross sections, when viewed in a cross section through the housing, and are of different lengths, measured in an axial direction of the spindle mechanism.

* * * * *